Dec. 3, 1968  J. H. BERTIN ET AL  3,414,076
GAS-CUSHION DEVICES INTENDED TO SUPPORT OR GUIDE A MOVABLE LOAD
Filed April 27, 1966  4 Sheets-Sheet 1

Dec. 3, 1968    J. H. BERTIN ET AL    3,414,076
GAS-CUSHION DEVICES INTENDED TO SUPPORT OR GUIDE A MOVABLE LOAD
Filed April 27, 1966    4 Sheets-Sheet 3

United States Patent Office
3,414,076
Patented Dec. 3, 1968

3,414,076
GAS-CUSHION DEVICES INTENDED TO SUPPORT OR GUIDE A MOVABLE LOAD
Jean Henri Bertin, Neuilly-sur-Seine, and Michel Jules Jacquot, Suresnes, France, assignors to Bertin & Cie, Paris, France, a company of France
Filed Apr. 27, 1966, Ser. No. 545,616
Claims priority, application France, Apr. 30, 1965, 15,435
7 Claims. (Cl. 180—124)

ABSTRACT OF THE DISCLOSURE

A pressure fluid-cushion device for a surface effect machine or the like movable along a bearing surface, comprising an annular bead made of flexible fluidtight material, a radially outer portion of said bead being attached to a rigid structure of said machine and a radially inner portion of said bead being secured to a fluid permeable central member mechanically linked to said structure, said bead being arranged to be inflated by said fluid thus to present a convex surface towards said bearing surface and to laterally confine the fluid cushion built up by pressure fluid crossing said central member.

---

There are already known devices intended to support or guide a movable load by generating one or more fluid cushions under pressure between the load and the surface on which the load is required to move (ground or water in the case of vehicles or boats, guide members or bearings in the case of a shaft or a conveyor belt). The cushion is thus interposed between two distinct bodies, and prevents them from coming into direct contact.

In the remainder of this description, reference will be made to air-cushions for the sake of simplicity, air being the most convenient fluid, but it may be replaced by another gas or another fluid.

In order to confine the air-cushion under pressure, known devices comprise a jet forming a continuous curtain of fluid or a flexible solid wall.

A suitably profiled and orientated nozzle is required in order to produce a jet in the form of a curtain, and this constitutes a complication.

It is difficult for the amount of leakage at the lower periphery of the flexible solid wall to be kept substantially constant when facing an undulated supporting surface, because of the downstream tension imparted by the pressure of the cushion to this wall. In addition, the said wall is not suitable for directly supporting bodies at rest, and accessories therefore have to be provided.

The device to which the invention relates comprises, on one of the bodies, for example the vehicle or the support of a conveyor belt, a solid wall made of flexible material and arranged after the manner of an annular bead whereof the external edge is attached to the body under consideration, and whereof the internal edge is fixed to a central strut permeable to the air which is intended to produce the fluid cushion, this bead being so arranged that when inflated by air under pressure it forms a projection which turns its convexity towards the opposite body and laterally confines the air-cushion.

The bead is preferably made in such a way that when inflated it assumes substantially the shape of a torus or part of a torus sectioned in the vicinity of its equatorial plane. It thus intrinsically has a stable shape suitable for static support if it is kept at a certain pressure, while being sufficiently flexible to become deformed under the action of obstacles, for example roughness or unevenness in the ground, and even to become deformed in accordance with undulations in the ground in order to ensure a substantially constant amount of leakage along its lower perimeter.

The strut which carries the lower edge of the bead may be made in the form of a plate provided with holes distributed over its surface in order to allow for the passage of air.

According to one feature of the invention, it is advantageous to link this strut in fixed or movable fashion to the body carrying the bead. A movable link equipped with members which impart a certain return force to the strut, counterbalancing the load, and also equipped with dampers enables a suspension system to be embodied.

The following description, which is given by way of non-limitative example, will give a good understanding in conjunction with the appended drawings of how the invention may be embodied, features apparent either from the text or from the figures naturally forming part of the said invention.

FIGURE 1 is a transverse section through an air-cushion platform according to a first form of embodiment of the invention.

FIGURE 2 diagrammatically illustrates this platform seen from below. In this figure, the line I—I indicates the position of the sectional plane in FIGURE 1.

Figure 1:
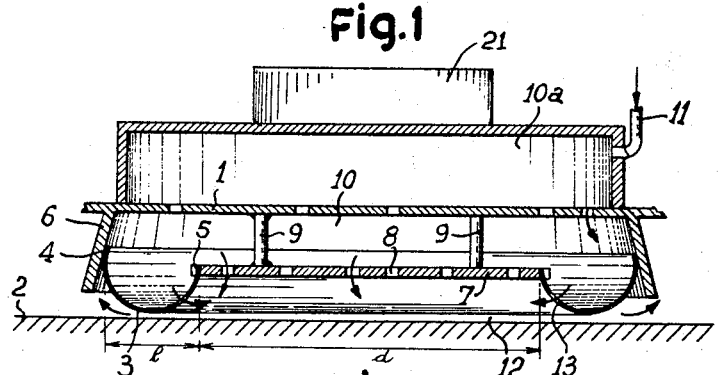
Figure 2:
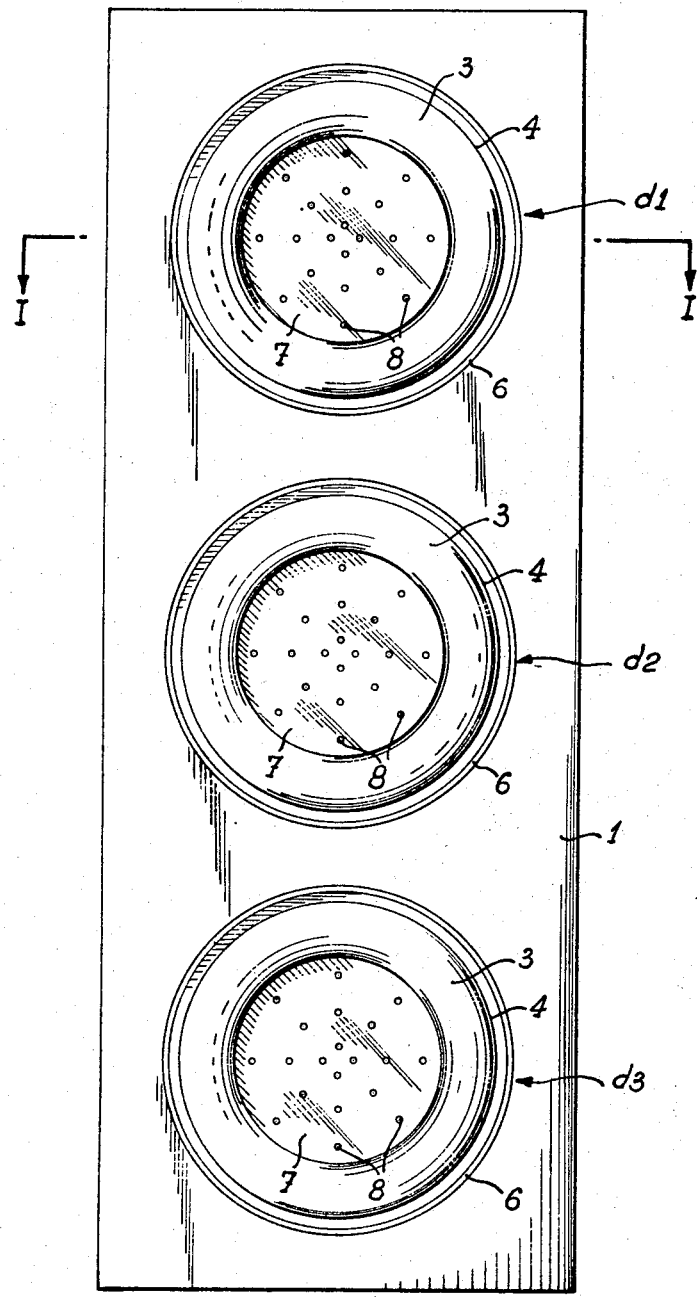

In FIGURES 1 and 2, one of the bodies which it is required to move is a land vehicle whereof the chassis may be seen at 1, while the other body 2 is the ground.

On its face turned towards the ground (FIGURE 2), the chassis 1 is equipped with devices $d_1$, $d_2$, $d_3$ suitable for producing the air-cushions, three in number in the example shown. (This number is clearly variable, and for wide platforms in particular cushions could be disposed symmetrically on either side of the axis of the platform.)

Each device for generating an air-cushion comprises an annular bead 3 made of a flexible material which is impermeable to air, such for example as a rubberised sheet. In the example shown, the edges 4 and 5 of this bead are of different diameters. The large-diameter edge 4 is attached to the internal face of a flange 6 fast with the wall 1 of the chassis of the platform and forming beneath this chassis a sort of cavity which surrounds and contains the bead. The internal edge 5 of the latter is fixed to the periphery of a strut-plate 7 drilled with holes 8 distributed over its surface. This plate is secured to the bottom of the chassis, for example by small pillars 9 welded to the plate 7 and to the chassis. The space 10 bounded by the wall 1 of the chassis with its flange 6, the bead 3 and the plate 7 is fed with air under pressure from a suitable source by a conduit 11.

The radial width 1 of the bead 3 is preferably less than the diameter $d$ of the strut-plate 7.

It will be understood that the air under pressure entering the space 10 inflates the bead 3, the latter being so arranged that it then assumes substantially the shape of part of a torus sectioned along two planes in the vicinity of the equatorial plane (planes of the edge 4 and the plate 7), turning its convexity towards the ground and projecting below the flange 6. The air also passes through the holes 8 in the plate 7 into the space 12 enclosed by the bead and the ground. However, if this air is not at too great a pressure the platform may be statically supported on the ground by the bead, while if the pressure is increased its effect acting on the platform 1 is to lift the latter until the bead is slightly separated from the ground (position of FIGURE 1). The air-cushion which is produced thus eliminates any solid contact between the platform and the ground, and there is no longer any solid friction to be overcome in order to move the platform.

The feeds to the various air-cushions are preferably independent of one another, so that a reduction in pressure in one cushion, for example due to an irregularity in the ground, has no effect on the feeds to the other cushions. Each cushion may thus have its own source of air under pressure, or the various cushions may be linked by independent pipe systems to a common generator of air under pressure.

Since it is desirable for there to be a volume of air under pressure in the immediate proximity of the air-cushion and suitable for rapidly restoring the cushion after a large momentary air-leak, another cavity 10a may be provided above the space 10, into which cavity the feed 11 of air under pressure will discharge instead of discharging directly into the space 10, the plate 1 then being provided with holes for the air to pass into the space 10.

The bead 3 may have a surface which is completely impermeable to air, or it may be drilled with holes 13 so oriented as to contribute to the feed of air to the space 12, while opposing leakage between the bead and the ground when the bead is spaced from the ground.

It will be understood that the flexibility of the bead enables it to become deformed in order to clear rough patches of ground.

The flange 6 which extends slightly downwards below the level of the edge 4 of the bead enables the platform to come to rest in the absence of air-pressure, and also makes it possible to avoid any excessive deformation of the bead 3 under the action of obstacles.

This flange is nevertheless not indispensable, and FIGURES 3 and 5 to 8 show some devices in which it is omitted, the edge 4 of the bead being fixed directly beneath the platform.

Figure 3:
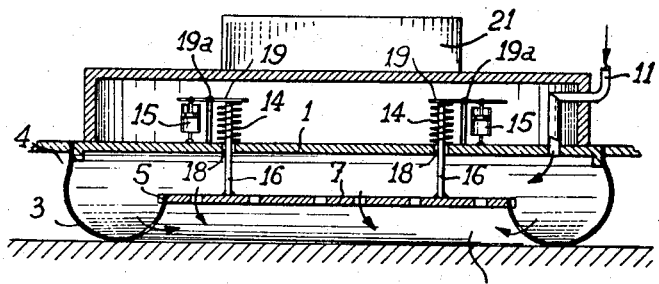
FIGURES 3 to 9 and 9a are transverse sectional views showing other forms of embodiment of the air-cushion.

The variant in FIGURE 3 also differs from the form of embodiment in FIGURE 1 in that the strut-plate 7, instead of being rigidly fixed to the bottom of the chassis 1, is linked to the latter by elastic members shown in the form of springs 14 acting in tension and associated with dampers 15. These springs are attached at one end to the chassis 1, and at the opposite end to rods 16 fast with the plate 7 and capable of sliding in holes 18 in the chassis 1. The pistons of the dampers 15 are fastened to the rods 16 by a suitable rocker lever 19, articulated at 19a to a fixed bearing. The elasticity of the air-cushion and of the bead 3 is thus supplemented by that of the springs 14 in order to provide an elastic suspension system for the chassis 1 and the load 21 which it carries. Their inertia consequently prevents the chassis and the load from following all changes in position of the bead 3.

Figure 4:
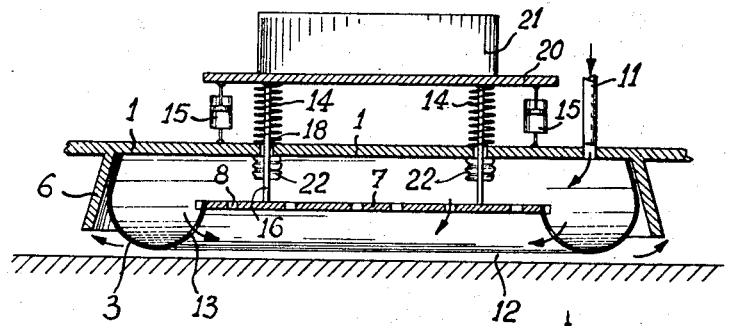

In the variant in FIGURE 4, the strut-plate 7 is no longer linked to the chassis 1 of the platform, but to a plate 20 carrying the load 21. The rods 16 which are fast at their ends with the chassis 1 (sic—this reference should apparently be of the strut-plate 7—cf. drawing) and the plate 20 pass through the chassis 1 by way of holes 18 equipped with sealing bellows 22, and the springs 14 acting in compression are interposed between the chassis 1 and the plate 20; dampers 15 are also provided between the chassis 1 and the plate 20.

Figure 5:
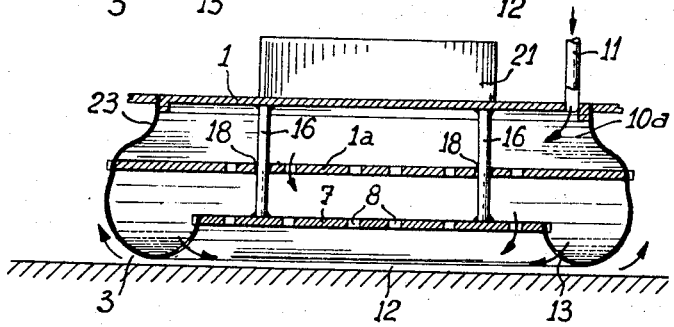

In FIGURE 5, the strut-plate 7 is linked to the chassis 1 on which the loads 21 rests by pillars or rods 16 which pass in sliding fashion through guides 18 provided on an intermediate plate 1a.

Suspended mounting is imparted to the chassis 1 in this case by reason of the fact that the lateral wall 23 of the cavity 10a, which is filled with air under pressure, is flexible, taking the form for example of an extension 23 of the bead 3 which is attached in fluid-tight fashion beneath the chassis 1.

It will be seen that in this example the load 21 is suspended in purely pneumatic fashion. Dampers could naturally be interposed between the chassis 1 and the plate 1a, as they are in FIGURE 4 between the plate 20 and the chassis 1.

Figure 6:
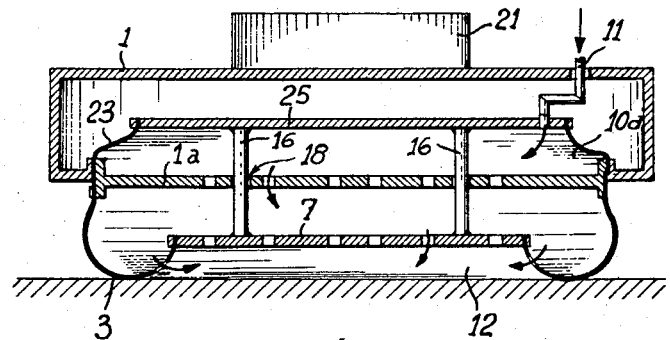

FIGURE 6 shows a variant of FIGURE 5 in which the intermediate plate 1a is fast with the chassis 1 carrying the load 21, the upper flexible wall 23 being fixed to a plate 25 linked to the strut 7 by rods 16 sliding in holes 18 in the plate 1a.

Figure 7:
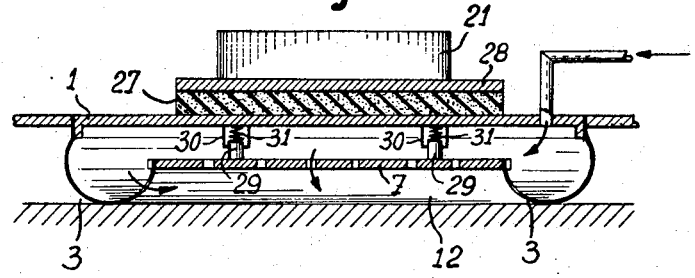

FIGURE 7 shows another arrangement.

A cushion of elastic material 27 is interposed between the chassis 1, which is equipped with air-cushion devices, and the plate 28 supporting the load 21.

This cushion 27 may be made in various ways. It may consist, for example, of an expanded flexible material such as cellular rubber, or of a pocket filled with gas under pressure.

The chassis 1 is suspended on the strut-plate 7 by pistons 29 sliding in guides 30 and bearing against springs 31. The guides 30 may by cylindrical, and may form dampers together with the pistons 29.

Figure 8:
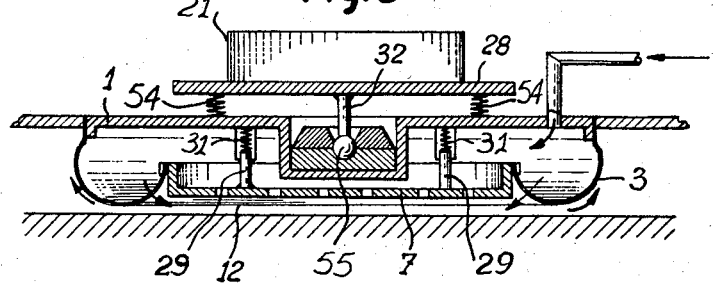

In FIGURE 8, the plate 28 which carries the load is elastically supported by the chassis 1, equipped with air-cushion devices, by way of the springs 54. An articulated linkage is also provided between the chassis 1 and the plate 28. In the example shown, the articulation 55 is fitted at the end of a vertical rod 32 fixed beneath the plate 28. The strut 7 is linked to the chassis 1 as in the example in FIGURE 7; in this case it takes the form of a cup to the edge of which the bead 3 is fixed.

This form of embodiment allows the air-cushion-generator device a certain amount of freedom of angular movement with respect to the suspended load-carrier plate, while preventing any lateral sliding.

Figure 9:
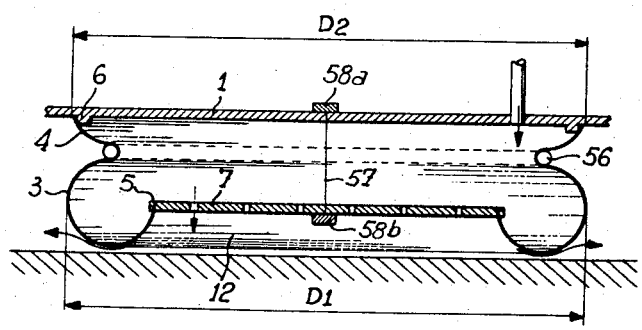

In the variant in FIGURE 9, the edges 4 and 5 of the bead are fixed to the same member as in FIGURE 3, but the strut 7 is suspended from the wall 1 of the chassis by a cable or wire 57 whereof the position coincides with the axis of the strut 7 when the load is uniformly distributed and the craft is resting on a horizontal surface. In order to fix the cable 57, its ends are attached to washers 58a and 58b fast with the chassis 1 and the strut 7 respectively, and substantially at the centre of the latter.

Figure 9A:
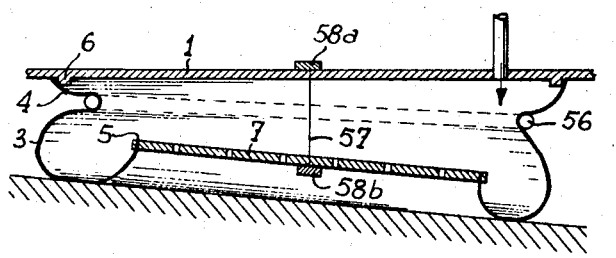

As will be understood, this arrangement enables the strut 7 and the bead to assume inclined positions with respect to the chassis 1 in order to follow variations in the inclination of the ground or other supporting surface (FIGURE 9a).

For the same purpose, the wire 57 could also be replaced by a rod terminating articulations at 58a and 58b.

In a plane passing between the plate 1 of the chassis and the strut 7, the diameter of the bead is preferably reduced by a hoop 56, thus increasing the flexible surface forming the bead and its capacity for deformation in order to follow irregularities in the ground, as shown in FIGURE 9a.

In some preferred embodiments, the external diameter $D_1$ of the torus formed by the bead 3 is at least equal to the diameter $D_2$ of the edge 4 fixed to the chassis.

Figure 10:
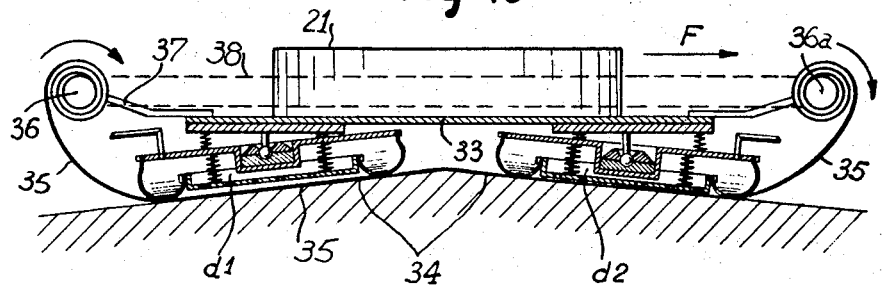
FIGURE 10 illustrates the use of the invention embodying a handling platform.

FIGURE 10 shows that a platform 33 supported by two air-cushions produced by devices like that shown in FIGURE 8 (or FIGURE 9) can rest on ground comprising gradients 34.

FIGURE 10 also shows the use of the invention in conjunction with a conveyor platform 33 which is caused to move on the ground by a flexible belt.

In the example shown, this belt 35, which is in direct contact with the ground and therefore passes beneath the air-cushions supporting the platform 33, winds on to a drum 36 carried at one end of the platform by arms 37, and unwinds from another drum 36a which is likewise fixed at the other end of the platform. The direction in which the platform moves forwards on the ground consequently corresponds to that of the arrow F. In this movement, the weight of the platform is supported by the air-cushions which are produced between the belt 34 and the two devices $d_1$, $d_2$ which in this example are like those in FIGURE 8. Counter-motion is provided by a chain or belt 38, or any other member, between the drums 36 and 36a, whereof one is driven by a suitable motor not shown. When the belt 35 is completely unwound from the drum 36a, the platform stops moving, and if it is desired to continue in the same direction the belt must be unwound from the drum 36 and re-wound on to the drum 36a while the platform is stationary and raised on props or other appropriate means, after which the movement may be continued.

Such a device may be used in factories or yards when it is required to move heavy loads over relatively short distances.

The device illustrated in FIGURE 10 would naturally also be applicable to the case in which the belt 35 would be an endless belt working after the manner of a track.

In particular, the bead and the strut-plate 7 could have a different shape in plan from the circular shape illustrated in FIGURE 2.

In general, the air under pressure could be replaced by a different fluid in the devices described above.

What we claim is:

1. A surface-effect machine comprising a structure movable along a bearing surface in spaced relationship therewith, a load carrier plate embodied in said structure, a flexible wall made of fluidtight material and inflatable by pressure fluid into an annular bead of general semi-toric shape, presenting its convexity towards said bearing surface and connected at its outer periphery to a portion of said structure, a fluid permeable disk-shaped strut peripherally attached to the inner periphery of said bead, mechanical means interconnecting said strut and said structure portion, and a flexible walled pneumatic chamber interposed between said plate and said structure portion.

2. Machine as claimed in claim 1, further comprising means for supplying pressure gas to said pneumatic chamber.

3. Machine as claimed in claim 1, wherein said pneumatic chamber communicates with the space bounded by the concavity of said bead, said strut and said structure portions.

4. Machine as claimed in claim 1, wherein said pneumatic chamber comprises a rigid wall extending on the side of said structure portion opposite to said strut and movable with respect to said structure portion, and wherein said mechanical means rigidly interconnect said strut and said rigid wall in constant spaced relation, whereby said strut and said rigid wall constitute an assembly bodily movable with respect to said structure portion extending therebetween.

5. Machine as claimed in claim 4, wherein said mechanical means are in slidably free crossing relation with said structure portion.

6. Machine as claimed in claim 1, wherein the flexible wall of said pneumatic chamber is an extension of the flexible wall of said bead beyond said structure portion.

7. Machine as claimed in claim 1, wherein said pneumatic chamber comprises a cushion of elastic material consisting of a pocket filled with gas under pressure.

References Cited

UNITED STATES PATENTS

| | | | |
|---|---|---|---|
| 3,185,240 | 5/1965 | Eggington et al. | 180—121 |
| 3,232,366 | 2/1966 | Cockerell | 180—124 |
| 3,246,712 | 4/1966 | Mackie | 180—119 |
| 3,253,667 | 5/1966 | Mackie | 180—124 |
| 3,260,322 | 7/1966 | Mackie | 180—124 |
| 3,266,757 | 8/1966 | Guienne | 180—127 X |
| 3,282,360 | 11/1966 | Amann et al. | 180—124 |
| 3,321,038 | 5/1967 | Mackie et al. | 180—124 |
| 3,331,461 | 7/1967 | Eggington | 180—127 X |

A. HARRY LEVY, *Primary Examiner.*